United States Patent [19]

Reiter

[11] Patent Number: 4,991,126
[45] Date of Patent: Feb. 5, 1991

[54] ELECTRONIC-AUTOMATIC ORIENTATION DEVICE FOR WALKERS AND THE BLIND

[76] Inventor: Lothar Reiter, Johann Straussgasse 27, A-1040 Vienna, Austria

[21] Appl. No.: 286,958
[22] PCT Filed: May 13, 1987
[86] PCT No.: PCT/AT87/00035
§ 371 Date: Nov. 4, 1988
§ 102(e) Date: Nov. 4, 1988
[87] PCT Pub. No.: WO87/07012
PCT Pub. Date: Nov. 19, 1987

[30] Foreign Application Priority Data

May 14, 1986 [AT] Austria ............................ A1289/86
Apr. 22, 1987 [AT] Austria ............................ A993/87

[51] Int. Cl.$^5$ ............................................. G01C 22/00
[52] U.S. Cl. ............................ 364/561; 364/559; 364/460; 235/105; 377/24.2
[58] Field of Search ............. 364/559, 561, 424.02, 364/444, 436, 450, 457, 448, 447, 449; 235/105; 340/573; 272/DIG. 5, DIG. 9; 377/24.2

[56] References Cited

U.S. PATENT DOCUMENTS

| 3,355,942 | 12/1967 | Freeman | 73/178 |
|---|---|---|---|
| 3,635,399 | 1/1972 | Dahlquist et al. | 235/105 |
| 3,710,083 | 1/1973 | Hoff | 364/561 |
| 3,840,726 | 10/1974 | Harrison | 364/561 |
| 4,129,087 | 12/1978 | Dimmick et al. | 364/457 |
| 4,220,996 | 9/1980 | Searcy | 272/DIG. 5 |
| 4,371,945 | 2/1983 | Karr et al. | 377/24.2 |
| 4,466,204 | 8/1984 | Wu | 377/24.2 |
| 4,563,685 | 1/1986 | Matsumoto et al. | 364/444 |
| 4,734,863 | 3/1988 | Honey et al. | 364/449 |
| 4,741,001 | 4/1988 | Ma | 377/24.2 |
| 4,855,942 | 8/1989 | Bianco | 364/561 |

FOREIGN PATENT DOCUMENTS

| 3333176 | 3/1984 | Fed. Rep. of Germany . |
|---|---|---|
| 3319208 | 8/1984 | Fed. Rep. of Germany . |
| 8202271 | 7/1982 | World Int. Prop. O. ......... 364/436 |

Primary Examiner—Parshotam S. Lall
Assistant Examiner—Michael Zanelli
Attorney, Agent, or Firm—Nixon & Vanderhye

[57] ABSTRACT

The automatic orientation device according to the invention for walkers and the blind is a small light weight and easily man-carried instrument. It contains an electronic-digital-calculating for continually determining the vectorial sum of the steps made by converting these steps into electrical pulses proportional to the strides and by automatic determination of the direction by means of a direction emitter in order to calculate the distance and direction covered from the point of departure. Whether by walking, running or horse riding the user is thus provided with optical or acoustic indicating or with perceptible vibrations indicating the distance and direction from the point of departure. In this way any person, including the blind, can find his way to the point of departure without any means of assistance, or geographical map or town plan, and in particular when the visibility is extremely poor.

8 Claims, 4 Drawing Sheets

ELECTRONIC-AUTOMATIC ORIENTATION DEVICE FOR WALKERS AND THE BLIND

Up to now, orientation for persons walking or riding in the open country was only possible with the use of diverse auxiliary aids, such as maps and compasses. The electronic handling of compasses and maps required a good deal of knowledge and experience and was nevertheless a slow and complex procedure, totally failing in the event of poor visibility. In any case, in choosing footpaths and running courses one was restricted to paths plotted on a map or at least dependent on finding fixed points of orientation. With or without the use of maps and compasses orientation always demanded steady attention, a good eyesight and high visibility.

Visually handicapped or blind people had hardly a chance to venture long-distance walking in town and country unaccompanied by either a person or a seeing-eye dog.

An automatic portable navigation device usable for walkers was presented in U.S. Pat. No. 3,355,942. Contrary to the present invention, that device is a fully mechanical, complicated model working on air pressure, with all the disadvantages of a precision mechanics construction, and is therefore no longer suited to present-day technical standards and requirements. Since that U.S. patent publication, no further or better solutions in the field of automatic orientation devices for walkers have been suggested.

Radio direction finders have the disadvantage of being subject to postal registration, as they might jam other devices. If one tried to run each apparatus on a separate radio frequency, more widespread use would be impossible. Besides, at least one additional radio station and good reception are necessary.

Electronic auto-navigation equipment is familiar in aviation, navigation, missile and vehicular technics. Thus, navigation equipment for road vehicles is known through the German disclosure document DE No. 29 41 331 A1, in the case of which-based on route and direction gauging through substraction of a distance vector and a target vector fed in over a feeding unit—a differential target vector is calculated. With that former invention the user had, at least before starting his tour, to feed in target vectors via keyboards or other feeding appliances. He had to measure out the coordinates on the road map and transfer them to the feeding unit. This procedure was complicated and not fit for everyone. Computer-suited contraptions such as light pens developed with respect to the mentioned defects had rendered the device yet more expensive. For common car drivers such devices are not only very costly, but also require high skills in working them, especially concerning correct transfer and feeding in of coordinates taken from road maps or charts.

Moreover, such navigation devices were not exchangeable from vehicle to vehicle, because the navigation device had to be demagnetized and adjusted to the respective vehicle at a high cost.

With this invention under consideration, however, which is light, small and cheap, any simple person and, above all, the visually handicapped and the blind are in a position to find their destination and their way back when running, walking or riding, without possessing any technical skill and without having to transfer coordinates from maps. The electronic automatic orientation device (EAOD) of the invention does not require any further aids or special handling, and, as it works independently and automatically, it is of considerable value to any hiker in emergency, and for the visually handicapped and the blind.

PRINTED MATTER

US-PS No. 4 416 066, US-PS No. 4 220 996, US-PS No. 4 053 755,

GB-PS No. 1 582 062, DE-OS NO. 25 02 176, DE-OS No. 33 08 431,

DE-OS No. 29 12 915.

DESCRIPTION OF THE DRAWING FIGURES

FIG. 1 is a schematic illustration of an electronic-automatic orientation device according to the present invention;

FIGS. 2A and 2B are schematic illustrations of a direction signal generating means for use with the invention illustrated in FIG. 1;

FIG. 3 is a schematic illustration of a stride motion converter according to the present invention;

FIG. 4 is a schematic illustration of the use of the orientation device of the present invention;

FIG. 5 is a block diagram illustrating the mathematical relations generated in the digital arithmetic unit, a part of which is illustrated in FIG. 1;

FIG. 6 is a view similar to FIG. 4, illustrating use of the stored memory feature of the present invention;

FIGS. 7 and 8 are illustrations of various locations of the orientation device of the present invention on an individual user; and FIGS. 9 and 10 are side and front elevational views of a device constructed in accordance with the present invention.

Figure 1:
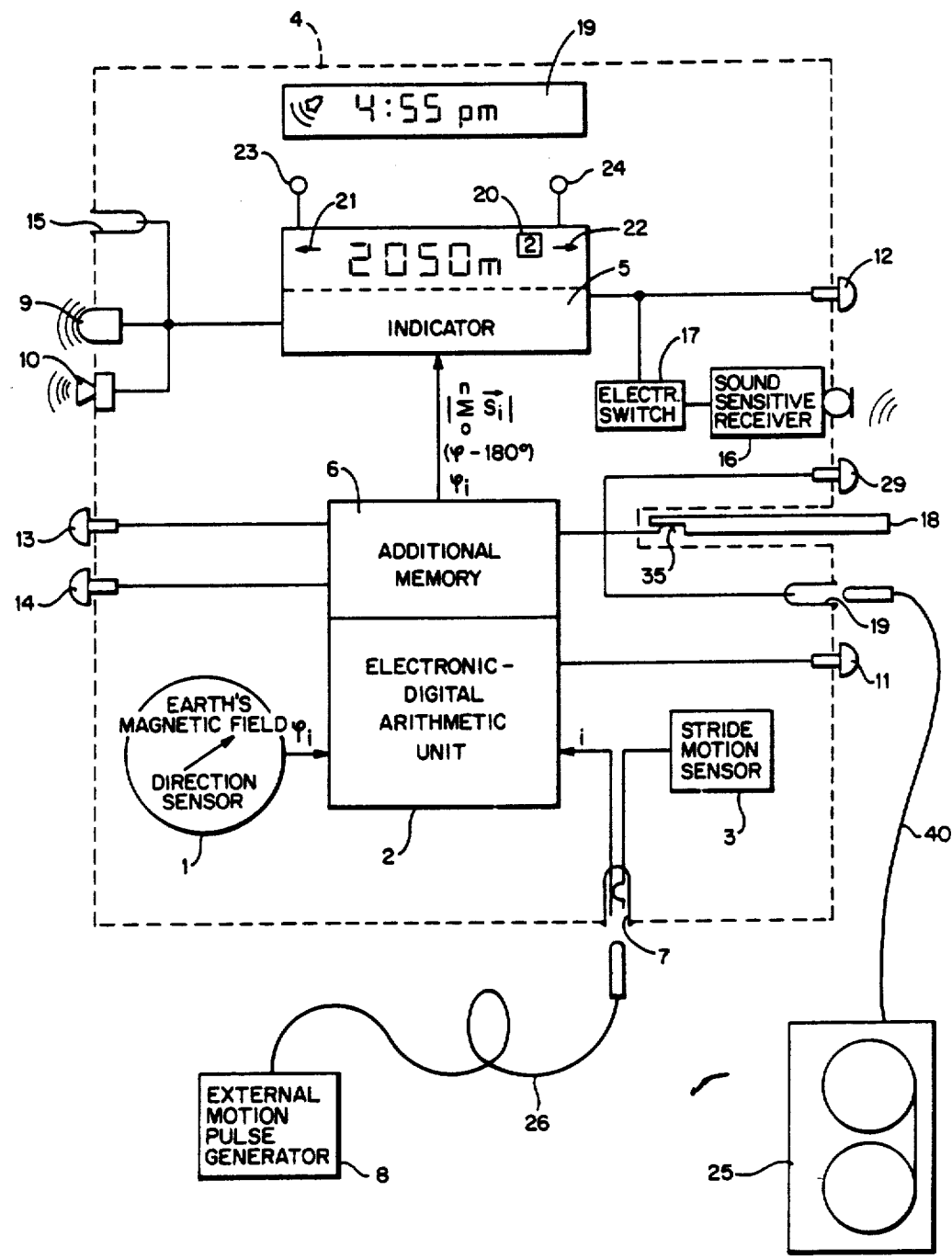
FIG. 1 is one embodiment of the electronic automatic orientation device (EAOD) (4) of the present invention in a basical representation.
Figure 2A:
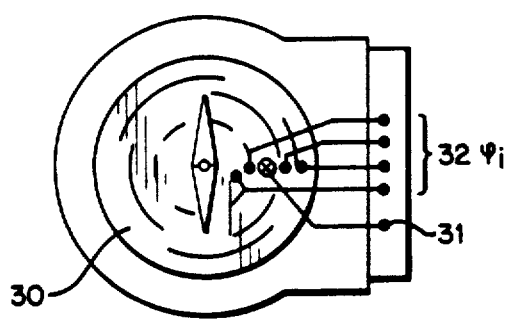
FIG. 2 is a view of a magnetic direction sensor (1) giving a direction signal, $p_i$ corresponding to the direction of motion, to the digital arithmetic unit (2). A possible direction sensor consists of e.g. a pivot bearing rotatable compass card (30) with binary or Gray-code transparent or non-transparent segments also carrying the permanent magnets. On one side of the compass card there is an LED (31), on the opposite side there are several photo diodes (32), which are lighted in a certain sequence according to the position of the direction of rotation of the compass card (30). With this the direction is at hand as a digital direction signal $p_i$ and is transferred to the digital arithmetic unit (2). As earth's magnetic field sensor (1) any other system, e.g. a gyro compass, magneto-sensitive semiconductors and resistances, hall effect-elements with analog-digital converters etc. may be used.
Figure 2B:
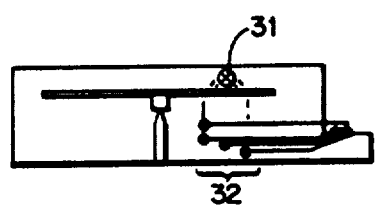
Figure 3:
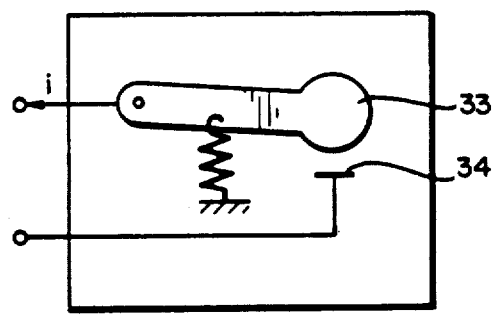

An electro-mechanical stride motion converter (3), see FIG. 3, consists exemplary of an acceleration pressure sensor or a piezo-electrical element with a fixed or elastically connected mass unit, or, in its simplest form, of a free-swinging pendulum, rotatable around an axis, which mirrors the swinging motion of a walking, running or riding user, and with each stride touches an opposite electric contact by force of which an electric circuit is closed, respectively, an electrical impulse i is passed on to the digital arithmetic unit (2), which analog with the momentary direction signal $p_i$ of the magnetical field sensor (1) will generate a single stride vector $\vec{s_i}$ in the digital arithmetic unit (2). The value of the stride vector $\vec{s_i}$ equals the stride length of the carrier and maybe adjusted, e.g. by means of a key (11) in consecutive stages or automatically through pulse processing logic.

The next stride of the carrier $i+1$, e.g. taken to another direction $\rho i+1$ produces a next vector $\vec{s}_{i+1}$ in the digital arithmetic unit and is added to the vector $$\sum_{o}^{n-1} \vec{s_i}$$

stored before, through which procedure a resulting distance-vector $$\sum_{o}^{n} \vec{s_i} = \sum_{o}^{n-1} \vec{s_i} + \vec{s}_{i+1}$$

is constantly summarized.

Figure 4:
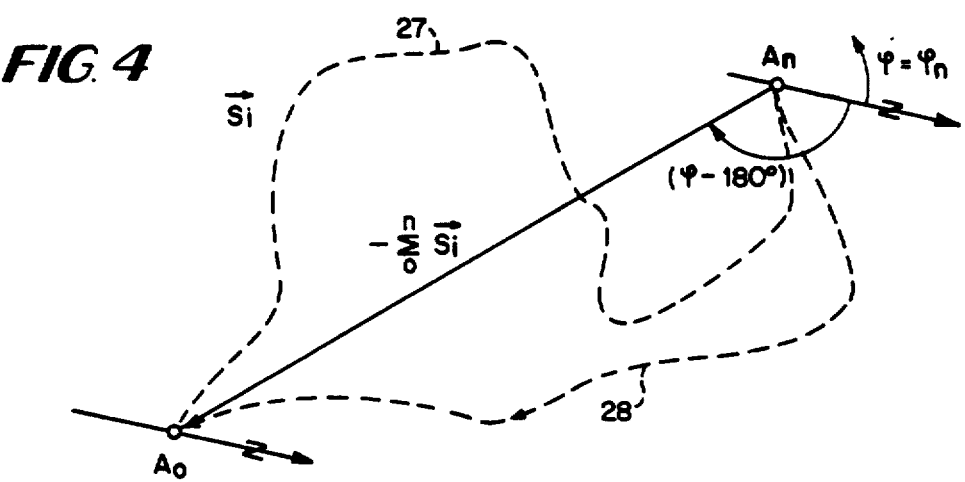

The $$\left| \sum_{o}^{n} \vec{s_i} \right|$$

of this momentary resulting distancevector represents the momentary distance from the starting point $A_o$ and the negative value of the direction of the distance-vector $(\rho - 180°)$ shows the direction back to starting point $A_o$ (see FIG. 4).

Figure 5:
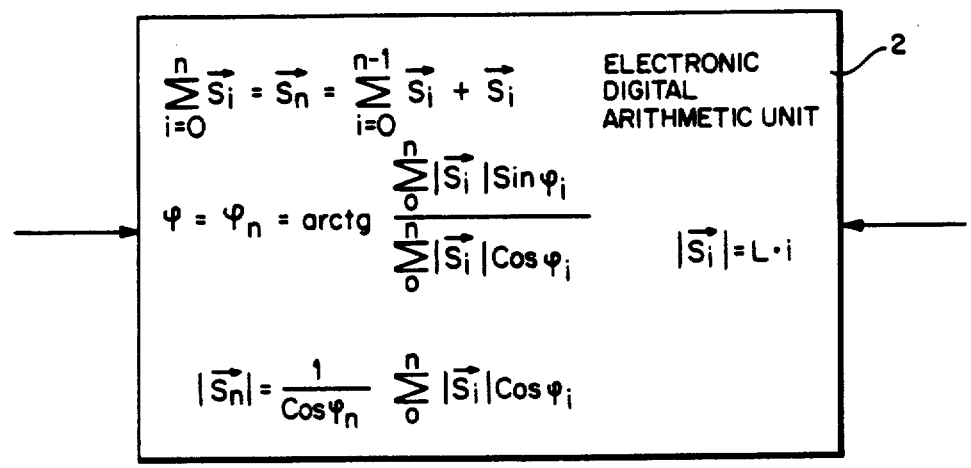

For the addition of two vectors the mathematical relations shown in FIG. 5 must e.g. be generated in the electronic digital arithmetic unit (2). The programming of the vector calculus can e.g. be done in rectangular or polar coordinates or differently, but is no further subject of this invention.

Distance and direction back to the starting point $A_o$ may be shown to the user with an indicator (5). This can be represented optically on an LC-display. As generally the carrier does not need to know the angular degree, it suffices that he knows if he is to turn and walk more to the right or to the left on his way back (28) in FIG. 4, this may be shown optically with a left-hand or right-hand arrow (21, 22) or with an LED (23, 24) flashing left or right, and, additionally, through an acoustic or vibratory guidance signal from a loudspeaker (10) or a vibrator (9). The correctness of the direction taken as against the nominal direction $(\rho - 180°)$ is to be perceived through the pitch or recurrence frequency of a beeper signal: If the carrier's direction differs increasingly from the nominal direction, the recurrence frequency of the beeper will increase, if he moves more closely toward the nominal direction, the recurrence frequency will slow down. If the walker has taken the exact nominal direction, in that case the momentary direction signal $\rho_i$ of the earth's magnetical field sensor would be equal to the calculated negative value $(\rho - 180°)$ of the direction of the momentary resulting distance-vector $\rho_i$, this could be shown to the carrier by e.g. two arrows (21 and 22) appearing simultaneously or through a permanent acoustic signal. The modulation of the guidance signal in its dependence on the size of the deviation of the momentary direction of motion $\rho_i$ from the nominal direction $(\rho - 180°)$ to starting point A can be effected either in the processor of the indicator (5) or in the processor of the electronic digital arithmetic unit (2).

The walkers (user) need not, however, walk the exact direction back to $A_o$ $(\rho - 180°)$, nor does he have to return on the same way he has come (27). He may take any way back (28) and still will always be guided toward the starting point $A_o$.

FIG. 4 is an exemplary walking route (27). Before the carrier starts from $A_o$ he switches on the EAOD. If he, e.g. wants to turn back at $A_o$, he switches on the indicator (5), e.g. with key (12). In this way the distance from starting point $A_o$ is shown on the LC-display in meters, and the direction towards the starting point $A_o$ $(\rho - 180°)$ is indicated by means of an acoustic or vibration guiding-signal.

If the EAOD is additionally equipped with an additional memory (6) for the resulting distancevectors of consecutive starting points $A_{o1}$, $A_{o2}$, ..., the precision and applicability can be increased considerably. This shall be explained by an practical example.

Figure 6:
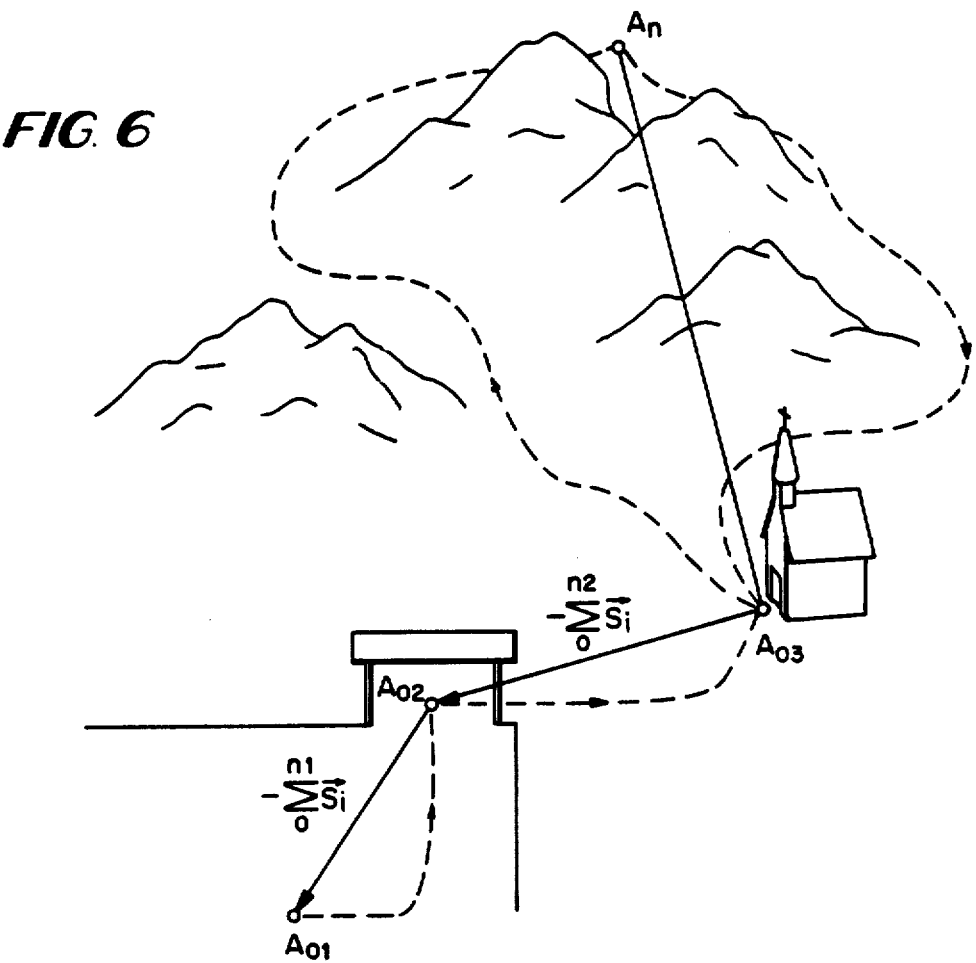

As shown in FIG. 6, the user leaves e.g. his car parked on a large parking lot difficult to survey. He switches on his orientation device $(A_{o1})$ and walks toward the entrance to the parking lot. Here he presses the memory key (13), through which procedure the resulting distance-vector $$\sum_{o}^{n1} \vec{s_i}$$

will be stored in the additional memory (6) and the calculation memory of the digital arithmetic unit (2) will be set at zero (deleted). With this, the entrance to the parking lot becomes the new starting point $A_{o2}$. Then the user moves on to e.g. the church square nearby and presses at the door of the church the memory key (1) once more. The resulting distance-vector $$\sum_{o}^{n2} \vec{s_i}$$

for this point is stored in the next memory position of the additional memory unit (6) and the calculation memory of the digital arithmetic unit (2) is set to zero again The church door will now become the new third starting point $(A_{o3})$. The carrier now goes for a walk of several hours in town or country. If he wishes to return at, say $A_n$, and therefore switches on the indicator (5) by pressing key (12), the distance $$\sum_{o}^{n3} \vec{s_i}$$

and the direction back to the preceeding starting point $A_{o3}$ will be indicated through the negative value of direction $(\rho - 180°)$ of the latest resulting distance vector $$\sum_{o}^{n3} \vec{s_{i}}$$

that is: back to the church square, on the LCD of the indicator. If the carrier-due to inaccuracies reaches that point only marginally, he walks as far as the church door, where he last pressed memory key (13), and he presses the recall key (14) through which the earlier resulting distance vector $$\sum_{o} \vec{s_i}$$

is transferred into the digital arithmetic unit 2) and the user is guided back to the entrance of the parking lot $A_{o2}$. Having finally reached the entrance of the parking lot the user once more presses the return key (14) through which the first, on a first memory position the additional memory (6) stored resulting distance-vector $$\sum_{o}^{n_1} \vec{s_i}$$

is transferred into the calculating memory of the digital arithmetic unit (2) and the user is guided back to the original starting point $A_{o1}$—to his parked car—by the EAOD according to the present invention.

Despite the user was walking several miles in several hours and notwithstanding possible deviations of direction and distance, errors are each time deleted at the intermediately stored starting points, both on the way out by zero-setting of the calculation memory of the digital arithmetic unit (2) and on the way back by recalling the stored distance vector and its transfer to the digital arithmetic unit. In spite of long walking the user will find his parked car within an area of a few meters. The accuracy is therefore increased so that also the blinds can make complete walking tours alone through city and country with the EAOD according to the invention.

A further considerable merit is that stages of tour may be interrupted by using public transport or a cab etc. The places of such interruptions only have to be stored by pressing a key. The EAOD permits arranging a tour or trip individually and freely, continuous walking is not being essential.

For the blinds this opens so far unknown possibilities of freedom of moving in town and country.

A further intentive arrangement of the EAOD extends its applications by one more fact: An external storing medium attachable from the outside (18) for the storage of distance vectors and stride lengths, similar to the internal, fixed additional store (6) in the orientation device makes it possible by an additional memory-store- and memory-read-in-key (29) which triggers the storage- or read-in procedure between the external storing medium (18) and the internal memory (6) to deliberately often repeat walking tours, make them available to others, or even buy them. As external storing media, e.g. (18) EE-PROM-cards and also other electrical or magnetical storing systems can be used.

As distance-vector data are also stored in the external storing medium (18) next to scaled stride lengths, distance-vector data in the digital arithmetic unit can be enlarged or reduced in relation to the stride lengths of the user, thus allowing to transfer and exchange the walking tours stored in the external storing media (18), independently of the stride length of the respective user.

Figure 7:
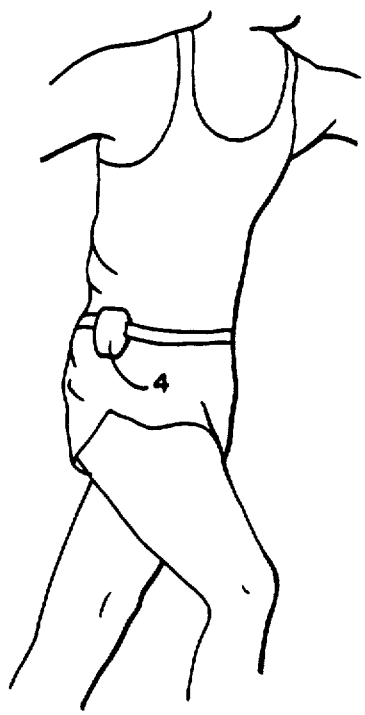

If e.g. a person has parked his car somewhere and another person wants to fetch it, the parker only has to hand over the store card to the other person. One only has to see to it that the device will be worn in the same place, as shown in FIG. 7, laterally at the waistband or at the belt. This can easily be checked as in the case of similar adjustment the same guidance signal will be preceived.

Figure 8:
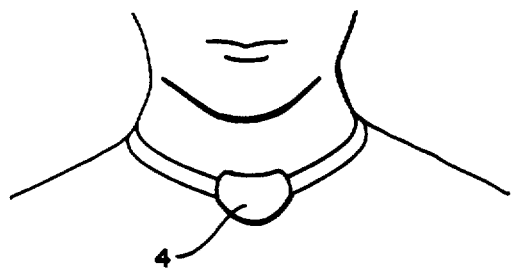

With another arrangement of the EAOD it is worn around the neck, similar to a necklace, see FIG. 8. Through attachment to the chest of the carrier a good reproduceable connection of the direction control with the direction of progress of the user being given.

As an external storing medium (18) a magnetical tape recorder is applicable. The EAOD is therefore equipped with a socket (19) for the attachment of a magnetical tape recorder (25), e.g. a so-called "walkman" for the storing and transfer of the vector data and the stride lengths, and can also be assembled together with such a tape recorder. On the tape of e.g. a standard cassette, in addition to the vector data of a walking or sightseeing tour, explanations of the sights at starting points can be recorded. With the earphone of an EAOD of the invention plus a tape recorder, historical informations as well as the guidance signal to the next sight can be heard. There is, too, the advantage of this "electronic tourist guide" that the tourist can choose any route from one sight to the next. Between given starting points tour stages of bus or train rides etc. can be inserted and along with this, programmed sightseeing tours can be arranged freely without the necessity of town or road maps.

In addition to a socket (15) for an external earphone for good audibility of the guidance signal in a noisy environment and so as not to draw the attention of others through the guidance signal, one also finds a connection (7) for an external motion pulse generator (8), in which case the internal stride motion converter (3) will be switched off. A connection for an external motion pulse generator has the merit of monitoring the motion at an optimal place and of converting it into electrical counting pulses. Thus the stride counting pulses can e.g. be gained from a known pressure converter attached to the jogging-boot. Otherwise a motion pulse generator can be connected with a bicycle.

The transfer of the counting pulses of an external motion pulse generator (8) can be effected over an electric or fibre optical circuit (26) or by means of infrared, supersonic or radio wave transmission.

Finally, an electronic digital watch with a digital display (19) and an alarm and time gauge integrated in the EAOD permits the scheduling of a tour and the recalling of a return on time through an alarm.

In a further arrangement of the EAOD the indicator (5) can be switched on with an electronic switch (17) in combination with a sound-sensitive receiver (16). If necessary, display and guidance signals can thus be switched on by the user through a call or whistle, hands not being needed, which is of great advantage to the athletic runner or horseman, the handicapped and ensures greater comfort.

To remind the user of the respective starting points when storing the route vectors, the storage positions in the additional store may be marked with numbers on the LCD (20) of the indicator (5) and can be noted on a writing area of the EAOD.

Figure 9:
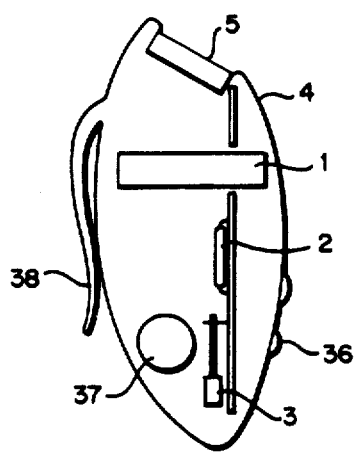
Figure 10:
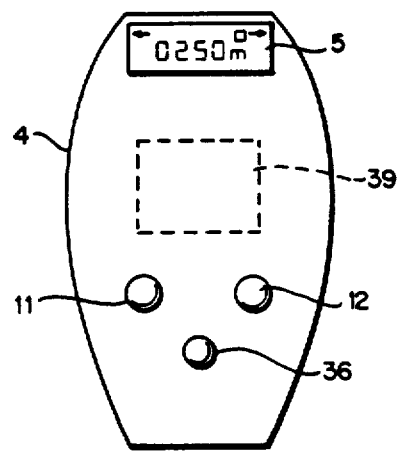

FIG. 9 shows an arrangement of the EAOD of the invention in natural size. In side-view the buckle (38), the battery (37), the contact pendulum of the stride motion converter (3), the magnetic turn control (1), a plate with the electronic digital arithmetic unit (2) as micro processor, the indicator (5) with the LCD, the casing (4) and a front view of the essential keys, such as the on/off switch (36), the stride length key (11) and the switch (12) of the indicator (5) and the guiding-signal and a writing area (39) are shown.

What is claimed:

1. An electronic-automatic orientation device for individuals having a stride and locomoting from a starting point in a predetermined direction, comprising:

an earth's magnetic field direction sensor for generating an electrical direction signal according to the direction of an individual's progress;

a stride-motion sensor for producing motion signals;

An electronic arithmetic unit for receiving the signals from the direction sensor and the stride-motion sensor, an indicator means;

said arithmetic unit generating a distance vector from the direction signal and the stride-motion signal, said stride-motion sensor having an electromechanical stride-motion converter for producing stride-counting pulses, said electronic arithmetic unit, when triggered by a stride-counting pulse, generating a stride vector proportional to a respective stride length, said stride vectors being continually summed to a resulting distance vector, the resulting distance vector having a value shown by said indicator means indicating a mementary distance to the starting point, a momentary opposite direction ($\psi - 180°$) of the resulting distance vector being given by said indicator means to indicate the momentary direction toward the starting point;

an electronic memory for storage of one or more distance vectors calculated in the said arithmetic unit and one or more memory keys for triggering a storage process of one or more momentary resulting distance vectors in an additional memory, means for resetting the arithmetic unit at a new starting point so that distance vectors from the new starting point have values which are summed and a momentary opposite direction ($\psi - 180°$) of a resulting distance vector back to this new starting point is given by said indicator means, one or more memory recall keys being effective, upon reaching the new starting point, to recall the resulting distance vector stored at the previous starting point for transfer from said additional memory to said digital arithmetic unit whereby the momentary opposite direction ($\psi - 180°$) of said stored resulting distance vector back to the previous starting point is given by said indicating means.

2. The device according to claim 1 including a motion pulse generator and a connecting device for connecting said motion pulse generator and said arithmetic unit.

3. The device according to claim 2 including a connector for connecting a signal connector line between the orientation device and means for interrupting said signals from said stride-motion converter.

4. The device according to claim 1 wherein an electronic watch is incorporated in the device.

5. The device according to claim 4 wherein the stride-motion converter includes a piezoelectric element with an attached mass whereby, with each stride of the individual, a signal is transmitted to said arithmetic unit.

6. The device according to claim 1 including an external memory medium connected to said memory, whereby vector data of the distance vectors and the stride lengths stored in said memory are transferrable to said external memory medium.

7. The device according to claim 1 including an external memory medium connected to said memory whereby the vector data of the distance vectors and the stride lengths stored in the external memory medium can be transferred to the digital arithmetic unit.

8. The device according to claim 7 wherein vector data of the distance vectors and the stride lengths stored in the memory are transferable to said external memory medium, and read and memory keys for respectively transferring the vector data to the arithmetic unit and to said external memory medium.

* * * * *